United States Patent
Cho et al.

(10) Patent No.: US 10,014,008 B2
(45) Date of Patent: Jul. 3, 2018

(54) CONTENTS ANALYSIS METHOD AND DEVICE

(71) Applicant: SAMSUNG ELECTRONICS CO., LTD., Suwon-si (KR)

(72) Inventors: Nam-gook Cho, Suwon-si (KR); Woo-jung Lee, Suwon-si (KR); Sang-yoon Kim, Seoul (KR); Young-jun Ryu, Suwon-si (KR); Byeong-seob Ko, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/122,344

(22) PCT Filed: Mar. 3, 2015

(86) PCT No.: PCT/KR2015/002014
§ 371 (c)(1),
(2) Date: Aug. 29, 2016

(87) PCT Pub. No.: WO2015/133782
PCT Pub. Date: Sep. 11, 2015

(65) Prior Publication Data
US 2016/0372139 A1 Dec. 22, 2016

Related U.S. Application Data

(60) Provisional application No. 61/946,977, filed on Mar. 3, 2014.

(51) Int. Cl.
*G10L 21/00* (2013.01)
*G06F 15/00* (2006.01)
(Continued)

(52) U.S. Cl.
CPC .............. *G10L 25/93* (2013.01); *G06F 17/30* (2013.01); *G10L 17/02* (2013.01); *G10L 25/00* (2013.01);
(Continued)

(58) Field of Classification Search
None
See application file for complete search history.

(56) References Cited

U.S. PATENT DOCUMENTS 6,550,057 B1 * 4/2003 Bowman-Amuah ... G06F 17/30
                                                    700/80
7,624,012 B2 * 11/2009 Pachet ..................... G10H 1/00
                                                    704/247
(Continued)

FOREIGN PATENT DOCUMENTS

JP    2012-90337 A    5/2012
JP      5243365 B2    7/2013
(Continued)

OTHER PUBLICATIONS

International Search Report and Written Opinion (PCT/ISA/210 & PCT/ISA/237) dated May 19, 2015 issued by the International Searching Authority in counterpart International Application No. PCT/KR2015/002014.

(Continued)

*Primary Examiner* — Marcus T Riley
(74) *Attorney, Agent, or Firm* — Sughrue Mion, PLLC

(57) ABSTRACT

Provided is a method of analyzing audio content. The method includes: extracting a feature value of the audio content; classifying the audio content on a section basis of the audio content based on the extracted feature value; and selecting at least one section for analyzing the audio content, (Continued)

and performing analysis on audio content of the at least one selected section based on a class to which the audio content of each section belongs.

15 Claims, 12 Drawing Sheets

(51) Int. Cl.
| | | |
|---|---|---|
| G10L 25/93 | (2013.01) | |
| G06F 17/30 | (2006.01) | |
| H04N 21/434 | (2011.01) | |
| G10L 25/00 | (2013.01) | |
| G10L 17/02 | (2013.01) | |
| G10L 25/57 | (2013.01) | |
| H04N 21/439 | (2011.01) | |

(52) U.S. Cl.
CPC ........... *G10L 25/57* (2013.01); *H04N 21/434* (2013.01); *H04N 21/4394* (2013.01)

(56) References Cited

U.S. PATENT DOCUMENTS

| | | | |
|---|---|---|---|
| 8,037,006 B2 | 10/2011 | Yen et al. | |
| 8,055,503 B2 | 11/2011 | Scarano et al. | |
| 8,935,169 B2 | 1/2015 | Fujii | |
| 2003/0050982 A1 | 3/2003 | Chang | |
| 2005/0091062 A1 | 4/2005 | Burges et al. | |
| 2005/0114325 A1 | 5/2005 | Liu et al. | |
| 2005/0238238 A1* | 10/2005 | Xu | G06F 17/30787 |
| | | | 382/224 |
| 2006/0085188 A1 | 4/2006 | Goodwin et al. | |
| 2006/0173909 A1 | 8/2006 | Carlson et al. | |
| 2006/0206324 A1 | 9/2006 | Skilling et al. | |
| 2007/0038458 A1 | 2/2007 | Park | |
| 2007/0124293 A1 | 5/2007 | Lakowske et al. | |
| 2007/0136059 A1* | 6/2007 | Gadbois | G10L 15/32 |
| | | | 704/246 |
| 2008/0091719 A1 | 4/2008 | Arenburg et al. | |
| 2009/0006102 A1 | 1/2009 | Kan et al. | |
| 2009/0112923 A1 | 4/2009 | Chang | |
| 2009/0228422 A1 | 9/2009 | Yen et al. | |
| 2009/0265165 A1 | 10/2009 | Apelqvist et al. | |
| 2010/0004926 A1* | 1/2010 | Neoran | G10L 25/48 |
| | | | 704/201 |
| 2010/0094639 A1* | 4/2010 | Rhoads | G06K 9/00442 |
| | | | 704/500 |
| 2010/0304735 A1 | 12/2010 | Hursey et al. | |
| 2011/0013810 A1 | 1/2011 | Engstrom et al. | |
| 2011/0029108 A1 | 2/2011 | Lee et al. | |
| 2011/0044512 A1 | 2/2011 | Bambha et al. | |
| 2011/0075851 A1 | 3/2011 | Leboeuf et al. | |
| 2011/0096135 A1 | 4/2011 | Hegde et al. | |
| 2012/0069131 A1* | 3/2012 | Abelow | G06Q 10/067 |
| | | | 348/14.01 |
| 2012/0197648 A1 | 8/2012 | Moloney | |
| 2013/0262111 A1 | 10/2013 | Eller et al. | |
| 2013/0282747 A1 | 10/2013 | Cheng et al. | |
| 2014/0007152 A1 | 1/2014 | Pora et al. | |

FOREIGN PATENT DOCUMENTS

| | | |
|---|---|---|
| KR | 1020070050271 A | 5/2007 |
| KR | 10-0792016 B1 | 1/2008 |
| KR | 1020110111195 A | 10/2011 |
| KR | 10-2012-0098211 A | 9/2012 |
| KR | 10-2013-0090570 A | 8/2013 |

OTHER PUBLICATIONS

Communication dated Jun. 15, 2017, issued by the Korean Intellectual Property Office in counterpart Korean Application No. 10-2016-7021907.

\* cited by examiner

CONTENTS ANALYSIS METHOD AND DEVICE

CROSS-REFERENCE TO RELATED APPLICATION

This is a National Stage Entry of International Application No. PCT/KR2015/002014 filed Mar. 3, 2015, which claims priority from U.S. Provisional Application No. 61/946,977 filed Mar. 3, 2014, the contents of all of which are incorporated herein by reference in their entirety.

TECHNICAL FIELD

The inventive concept relates to a method and a device for analyzing content.

BACKGROUND ART

Multimedia content may include audio content and video content. A device may analyze multimedia content or summarize content by analyzing audio content.

As a method of analyzing audio content, there exists a method of extracting a feature of audio content by using a method such as a mel-frequency cepstral coefficient (MFCC) method, etc., and classifying audio content depending on a music genre or a sound characteristic. Audio content may be classified through comparison with models of a class set in advance.

However, according to a conventional method, since audio content may be classified in one step, it is difficult to provide stable performance depending on a characteristic of audio content.

DETAILED DESCRIPTION OF THE INVENTION

Technical Solution

The inventive concept provides a method and a device for analyzing content, and a method of classifying audio content on a section basis of the audio content, and selectively analyzing the classified audio content on a section basis.

Advantageous Effects

According to an exemplary embodiment, analysis is selectively performed depending on a feature value of audio content for each section during content analysis, so that content analysis performance may improve.

BEST MODE

Figure 1:
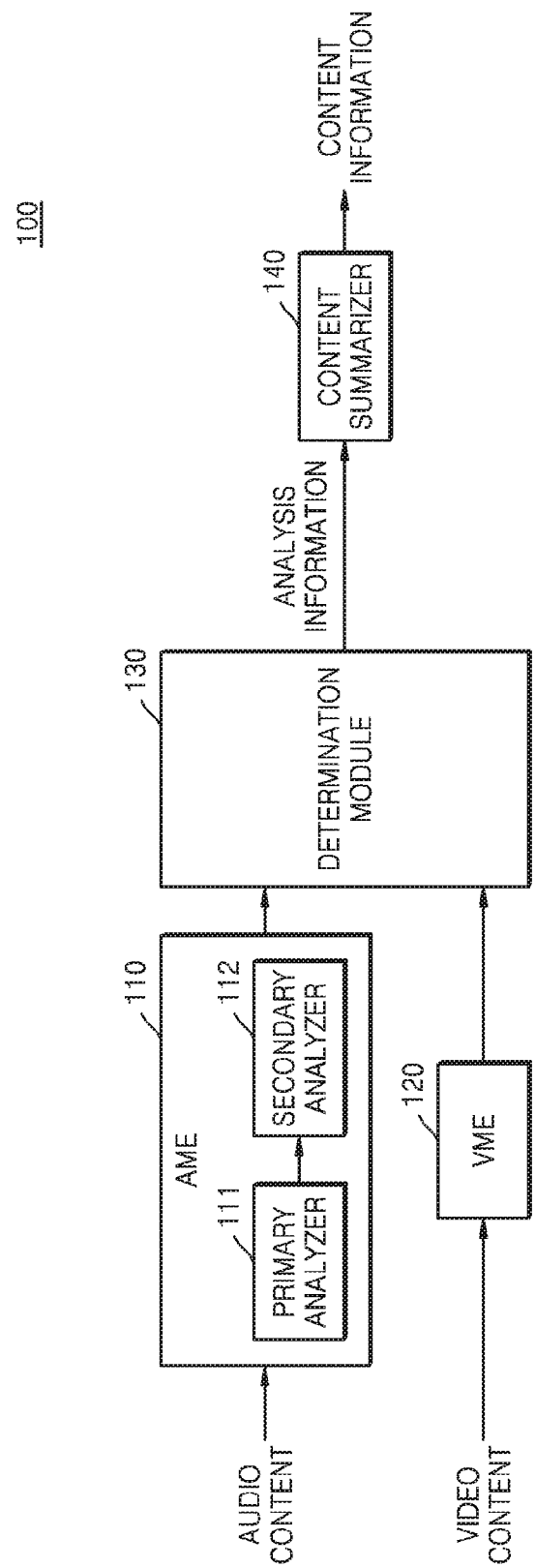
FIG. 1 is a block diagram of an inner structure of a device for analyzing content according to an exemplary embodiment.

According to an aspect of the inventive concept, there is provided a method of analyzing audio content, the method including: extracting a feature value of the audio content; classifying the audio content on a section basis of the audio content on the extracted feature value; and selecting at least one section for analyzing the audio content, and performing analysis on audio content of the at least one selected section based on a class to which the audio content of each section belongs.

The classifying may include classifying the audio content by comparing a feature value of the audio content with a feature value of a database by using the database including information regarding at least one feature value of the audio content belonging to each class.

The extracting of the feature value may include: decomposing the audio content into at least one elementary function; selecting at least one of the at least one elementary function as a dominant elementary function for each section with respect to the decomposed audio content; and extracting a basis function as the feature value of the audio content for each section by using the at least one selected dominant elementary function.

The extracting of the feature value may include: extracting at least one instantaneous feature value from a predetermined section of the audio content; and extracting a statistical feature value from the at least one extracted instantaneous feature value belonging to the predetermined section.

The performing of the analysis may include: selecting a section of the audio content belonging to a voice class; and performing at least one of voice recognition and speaker recognition with respect to the audio content of the selected section.

The performing of the analysis may include determining a topic for the audio content of the predetermined section by using results of the voice recognition or the speaker recognition.

The performing of the analysis may include: selecting a section of the audio content belonging to environment noise class; and detecting an acoustic event included in the audio content for each selected section.

The performing of the analysis may include: performing analysis on video content corresponding to the selected section; and correcting analysis results for the audio content by using analysis results for the video content.

According to another aspect of the inventive concept, there is provided a device including: a receiver for receiving audio content; and a controller for extracting a feature value of the audio content, classifying the audio content on a section basis of the audio content based on the extracted feature value of the audio content, selecting at least one section for analyzing the audio content, and performing analysis on audio content of the at least one selected section based on a class to which the audio content of each section belongs.

MODE OF THE INVENTION

Hereinafter, exemplary embodiments are described in detail with reference to the accompanying drawings. However, detailed descriptions of known functions or constructions will be omitted in the description below and the accompanying drawings so as not to obscure the sprit of the exemplary embodiments. Also, it is noted that like reference numerals are used for like elements throughout the drawings.

Terms or words used in the present specification and claims below should not be construed as being limited to their general or dictionary meanings, and an inventor should construe his invention using meanings and concepts matching the technical spirit of the exemplary embodiments based on the principle that the inventor may appropriately define his invention with terms for explaining in the best way possible. Therefore, since embodiments described in the present specification and constructions illustrated in the drawings are mere exemplary embodiments and do not reflect the entire technical spirit of exemplary embodiments, it should be understood that there may be various equivalents and modifications that may replace these at the time of filing.

In the accompanying drawings, some elements have been exaggerated, omitted or schematically illustrated, and the size of each element does not fully reflect an actual size. Exemplary embodiments are not limited to a relative size or interval drawn in the accompanying drawings.

When something "includes" a component throughout the specification, another component may be further included, and another component is not excluded unless specified otherwise. Also, the term "unit" used herein refers to a software component or a hardware component such as a field-programmable gate array (FPGA) or an application-specific integrated circuit (ASIC), and the "unit" performs some functions. However, the "unit" is not limited to software or hardware. The "unit" may be formed so as to be in an addressable storage medium, or may be formed so as to operate one or more processors. Thus, for example, the "unit" may include components such as software components, object-oriented software components, class components, and task components, and may include processes, functions, attributes, procedures, subroutines, segments of program code, drivers, firmware, microcodes, circuits, data, a database, data structures, tables, arrays, and variables. A function provided by the components and "units" may be associated with the smaller number of components and "units", or may be divided into additional components and "units".

Hereinafter, exemplary embodiments are described in detail with reference to the accompanying drawings to enable a person of ordinary skill in the art to easily carry out the exemplary embodiments. However, the exemplary embodiments may be implemented in various different forms and are not limited to the embodiments described herein. Also, in the drawings, for clear description of exemplary embodiments, portions unrelated to the description are omitted, and like reference numerals are used for like elements throughout the specification.

Hereinafter, exemplary embodiments are described with reference to the accompanying drawings.

FIG. 1 is a block diagram of an inner structure of a device for analyzing content according to an exemplary embodiment.

The device 100 according to an exemplary embodiment may be a terminal device that may be used by a user. For example, the device 100 may include a smart television (TV), an ultra high definition (UHD) TV, a monitor, a personal computer (PC), a notebook computer, a mobile phone, a tablet PC, a navigation terminal, a smartphone, a personal digital assistant (PDA), a portable multimedia player (PMP), and a digital broadcast receiver.

The device 100 according to an exemplary embodiment may analyze audio content in two operations. In a primary analysis operation, the device may extract a feature of audio content and classify the audio content on a section basis depending on the extracted feature. In a secondary analysis operation, the device 100 may select a section of the audio content to analyze depending on a class to which each section belongs, and perform analysis on the selected audio content section. The device 100 may select an audio content section depending on analysis method.

In addition, the device 100 may perform analysis on video content corresponding to the audio content together. The device 100 may finally determine analysis information for multimedia content including video content and audio content by comparing analysis results of the video content with analysis results of the audio content.

The analysis information for the content may include, for example, keyword information included in content on a section basis, speaker information, information regarding whether an acoustic event of a feature set in advance is included, etc.

Referring to FIG. 1, the device 100 may include an audio mining engine (AME) 110, a video mining engine (VME) 120, a determination module 130, and a content summarizer 140.

The AME 110 and the VME 120 may analyze audio content and video content, respectively. The AME 110 may analyze audio content in two operations and output analysis information for the audio content. The VME 120 may output analysis information for video content.

The determination module 130 may compare content analysis information output by the AME 110 and content analysis information output by the VME 120 to finally determine analysis information for each section of the content. For example, the determination module 120 may finally determine analysis information for each section of multimedia content by correcting content analysis information output by the AME 110 using content analysis information output by the VME 120. Analysis information for each section of content may include, for example, keyword information included in a predetermined section, speaker information, information regarding whether an acoustic event of a feature set in advance is included, etc. In addition, the analysis information for each section of content may further include information regarding start and end times of a relevant section as position information of a section.

The determination module 130 may output content analysis information in real-time by consistently performing analysis on content input in real-time. The content summarizer 140 may generate summary information, a topic, highlight scene information, rating information, etc. for content of a predetermined section based on finally determined analysis information of content, and output the same. The content summarizer 140 may generate summary information, rating information, etc. for content using keyword information, speaker information, etc. included for each section, included in content analysis information.

The device 100 may output content analysis information or summary information for content viewed in real-time or content selected by a user. The user may see content summary information output by the device 100 to understand the summary, the key subject, etc. of the content viewed currently or selected by the user. Therefore, according to a content analysis method by an exemplary embodiment, the user may recognize the summary and primary information of content even without viewing the entire content, so that user convenience may increase.

For future retrieval, the device 100 may store content analysis information generated by the determination module 130 and summary information generated by the content summarizer 140 in a storage space. The device 100 may use content analysis and summary information for retrieving content. For example, the device 100 may retrieve content including a specific keyword by using content analysis and summary information stored in advance.

Hereinafter, respective elements of the device 100 are described in more detail with reference to FIGS. 2 to 5.

Figure 2:
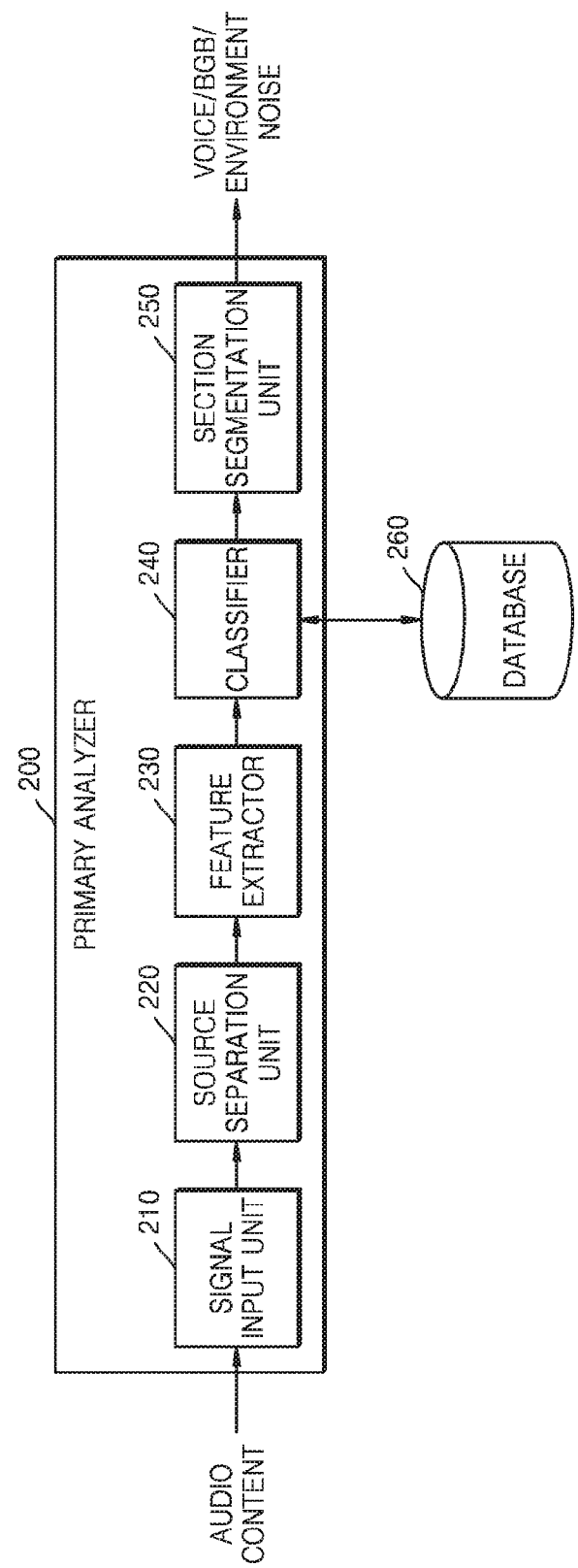
FIG. 2 is a block diagram of an inner structure of a primary analyzer of an audio mining engine (AME) according to an exemplary embodiment.

FIG. 2 is a block diagram of an inner structure of a primary analyzer 200 of the audio mining engine (AME) 110 according to an exemplary embodiment. The primary analyzer 200 of FIG. 2 corresponds to a primary analyzer 111 of FIG. 1.

The primary analyzer 200 may classify audio content by extracting a feature of audio content for each predetermined section, and determining a class to which the audio content belongs for each section. The primary analyzer 200 may output class information of the audio content determined for each section.

Referring to FIG. 2, the primary analyzer 200 may include a signal input unit 210, a source separation unit 220, a feature extractor 230, a classifier 240, and a section segmentation unit 250.

The signal input unit 210 may receive audio content to transfer the same to the source separation unit 220. The source separation unit 220 may separate input audio content for each sound source. The audio content may include various sounds for each sound source, and for example, include various sounds such as a human voice, a musical instrument sound, a car horn sound, etc. The source separation unit 220 may selectively perform source separation of audio content, and the primary analyzer 200 may classify audio content according to a sound source separated by the source separation unit 220.

The feature extractor 230 may extract a feature of audio content. In the case where audio content is separated for each sound source by the source separation unit 220, the feature extractor 230 may extract a feature of the audio content for each sound source.

The feature extractor 230 may extract a feature of the audio content by performing extraction of instantaneous features and extraction of statistical features. The extraction of the instantaneous features may be performed during a very short section of the audio content, and extraction of the statistical features may be performed by obtaining a statistical value from a predetermined amount of instantaneous features. For example, the statistical feature may be extracted from mean, standard deviation, skewness, kurtosis, first order/second order derivation, etc. of a predetermined amount of instantaneous features.

A method of extracting instantaneous features of audio content using the feature extractor 230 may be performed by using two methods.

First, there is a method of extracting instantaneous features by extracting perceptual features of audio content. For example, the perceptual features may include a spectral centroid, spectral flatness, spectral flux, spectral rolloff, zero crossing rate, etc. for a sound signal of audio content. The device 100 may extract perceptual features of audio content by using together a mel-frequency cepstral coefficient (MFCC) method which is one of methods of extracting a feature of audio content.

Second, there is a method of extracting instantaneous features by extracting a unique characteristic of audio content. According to the second method, unlike the first method, a feature of audio content may be extracted by obtaining a basis function for an audio content signal. The second method is described in more detail below with reference to FIG. 3.

The feature extractor 230 may extract a feature by using only one of the two methods, or extract a feature of audio content by mixing the first method and the second method. For example, the feature extractor 230 may extract a final feature value of audio content by comparing a feature value obtained by using the first method with a feature value obtained by using the second method.

The feature extractor 230 may extract instantaneous features from a predetermined section by using the above-described method of extracting instantaneous features of audio content, and extract statistical features from a plurality of instantaneous features for a predetermined section. The feature extractor 230 may output the statistical features of the audio content obtained for each section to the classifier 240.

The classifier 240 may classify audio content of each section depending on a feature value for each section output by the feature extractor 230. The classifier 240 may classify the audio content for each unit section of a size set in advance.

For example, the classifier 240 may classify each section of the audio content into one of a voice, background music, and environment noise. A section including a speaker's voice may be classified as a voice. A section including sounds of a musical instrument and music may be classified as background music. A section including noise that may occur in a predetermined environment or that does not correspond to a voice or background music may be classified as environment noise. Models of an audio content characteristic value that may be classified as a voice, background music, environment noise, etc. may be stored in a database 260 in advance.

The classifier 240 may classify audio content on a section basis by comparing audio content feature values belonging to a voice, background music, environment noise, etc., respectively, stored in the database 260 with feature values extracted by the feature extractor 230.

When a degree of similarity between a feature value stored in the database 260 and a feature value extracted by the feature extractor 230 is equal to or greater than a predetermined level, the classifier 240 may determine a class to which the feature value stored in the database 260 belongs as a class of audio content of a current section.

The classifier 240 may determine the class of the audio content, and then update audio content feature values stored in the database 260 using the feature values of the audio content used while determining the class. The classifier 240 may store a currently extracted feature value of the audio content in the database 260 in association with a class to which the feature value belongs.

The above-described voice, background music, environment noise, etc. are merely exemplary, and audio content may be classified into various classes.

The section segmentation unit 250 may re-determine a class of audio content based on a longer section with respect to audio content of respective sections classified by the classifier 240. For example, the section segmentation unit 250 may re-classify the audio content using one class in a 10-second unit time with respect to a plurality of audio content classified for each section of a 1~5 second unit time. In the case where only a section of 1 second or so in a 10-second unit time section is classified as environment noise, and a section of the rest of 9 second or so is classified as a voice, the section segmentation unit 250 may re-classify the section classified as the environment noise into a voice.

Therefore, audio content is re-classified in a longer section, so that an error that may occur as the audio content is classified on a section basis of a short unit time may be corrected. The length of the above-described long section may be a value set in advance or a value that may be variably determined depending on a feature of the audio content.

Also, the section segmentation unit 250 may output class information of audio content for sections corresponding to a start point and an end point. The class information may include a start point, an end point, and labeling information. The start point and the end point mean a position of the above-described re-classified long section. Class information for successive content sections classified as the same class may be output as one class information so that the same labeling information may not exist successively. The labeling information is information regarding a class to which audio content belongs, and may include one of a voice, background music, and environment noise, for example.

Hereinafter, the second method among the above-described methods of extracting a feature of audio content will be described in more detail with reference to FIG. 3.

Figure 3:
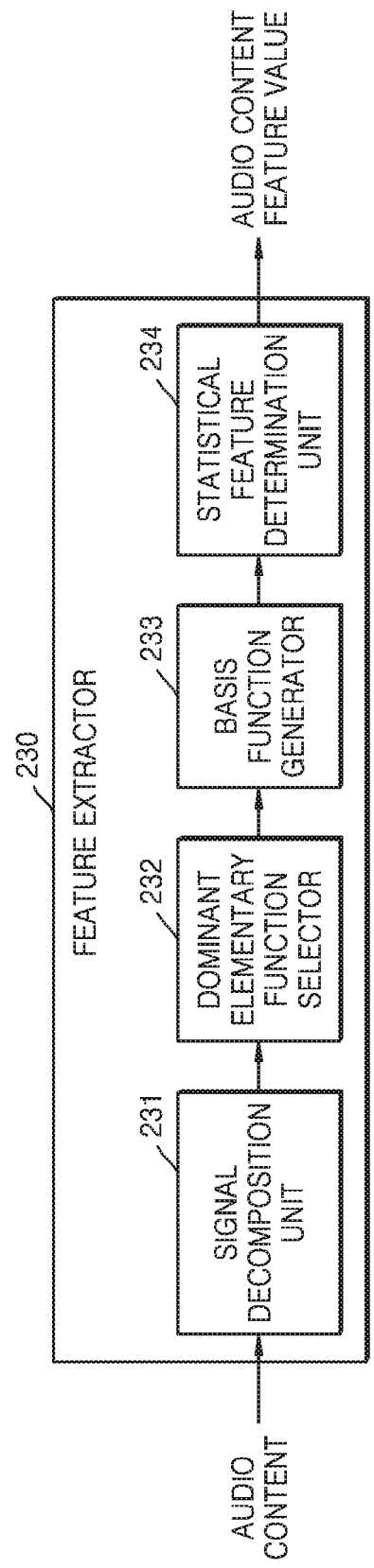
FIG. 3 is a block diagram of an inner structure of a feature extractor according to an exemplary embodiment.

FIG. 3 is a block diagram of an inner structure of a feature extractor according to an exemplary embodiment.

The feature extractor 230 illustrated in FIG. 3 operates according to a method of extracting an instantaneous feature by extracting a unique characteristic of audio content by the above-described second method. According to the second method, a basis function which is a unique characteristic of content may be extracted as an instantaneous feature.

Referring to FIG. 3, the feature extractor 230 may include a signal decomposition unit 231, a dominant elementary function selector 232, a basis function generator 233, and a statistical feature determination unit 234.

The signal decomposition unit 231 may decompose an audio content signal using a sparse coding method. As a result of decomposition, an audio content signal may be decomposed to at least one elementary function.

The dominant elementary function selector 232 may determine a dominant elementary function for the audio content signal decomposed by the signal decomposition unit 231. The dominant elementary function selector 232 may select at least one of at least one elementary function which is a decomposition result of the audio content as a dominant elementary function.

The basis function generator 233 may generate a basis function by synthesizing an elementary function selected as a dominant elementary function. A basis function may be output as an instantaneous feature value of audio content.

The statistical feature determination unit 234 may output statistical features from instantaneous feature values of a plurality of audio content. Extraction of the statistical features may be performed by obtaining statistical values from a predetermined amount of instantaneous features.

Hereinafter, a secondary analysis method of an AME is described in more detail with reference to FIG. 4.

Figure 4:
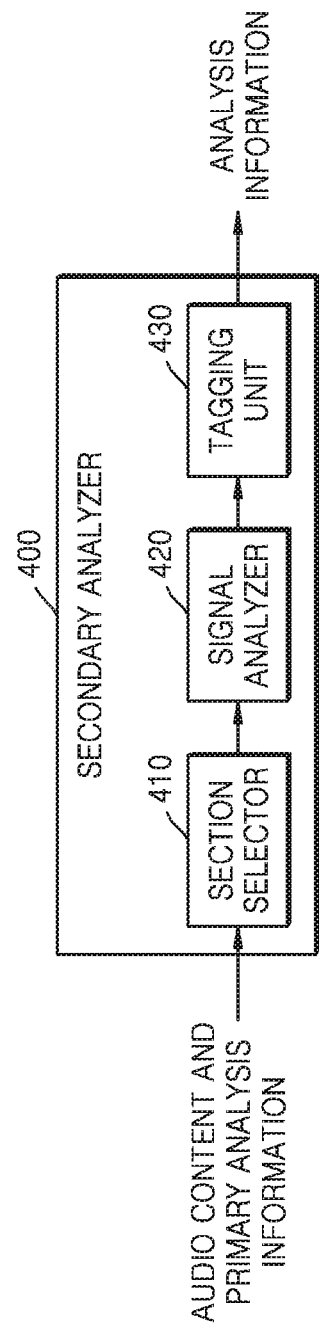
FIG. 4 is a block diagram of an inner structure of a secondary analyzer of an AME according to an exemplary embodiment.

FIG. 4 is a block diagram of an inner structure of a secondary analyzer 400 according to an exemplary embodiment. The secondary analyzer 400 of FIG. 4 corresponds to a secondary analyzer 112 of FIG. 1.

The secondary analyzer 400 according to an exemplary embodiment may perform secondary analysis using class information output by the primary analyzer 111 and audio content. The secondary analyzer 400 may select an audio content section to analyze by using the class information, and perform secondary analysis on the selected audio content section.

Referring to FIG. 4, the secondary analyzer 400 may include a section selector 410, a signal analyzer 420, and a tagging unit 430.

The section selector 410 may select a section of audio content to analyze based on class information. For example, in case of intending to extract a keyword and analyze audio content based on the extracted keyword, it is desired to analyze an audio content section including a voice signal from which a keyword may be extracted. Therefore, the section selector 410 may select an audio content section classified as a voice.

The signal analyzer 420 may perform analysis on an audio content section selected by the section selector 410. For example, the signal analyzer 420 may extract a keyword included in the selected section by performing voice recognition on the selected section. The extracted keyword may be output as analysis information of content.

The tagging unit 430 may tag a section of audio content corresponding to analysis information output by the signal analyzer 420. For example, the tagging unit 430 may output keyword information extracted by the signal analyzer 420 as analysis information for a corresponding audio content section.

Hereinafter, a method of generating a content summary using tagged analysis information is described in more detail with reference to FIG. 5.

Figure 5:
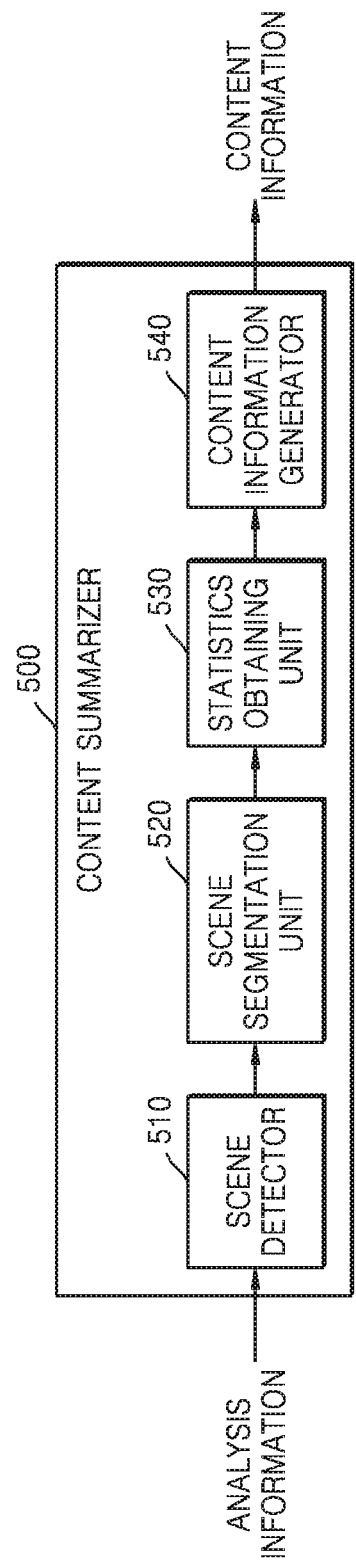
FIG. 5 is a block diagram of an inner structure of a content summarizer according to an exemplary embodiment.

FIG. 5 is a block diagram of an inner structure of a content summarizer according to an exemplary embodiment. The content summarizer 500 of FIG. 5 corresponds to the content summarizer 140 of FIG. 1.

The content summarizer 500 may generate and output content information for audio content using at least one analysis information tagged for each section of audio content.

Referring to FIG. 5, the content summarizer 500 may include a scene detector 510, a scene segmentation unit 520, a statistics obtaining unit 530, and a content information generator 540.

A scene according to an exemplary embodiment is a section including one event that has occurred at successive times in one space, and may be segmented depending on contextual meaning.

The scene detector 510 may detect a scene of content. For example, the scene detector 510 may detect a scene based on similarity of a video signal between two successive frames. Also, the scene detector 510 may detect switching to a new scene by detecting a silent section from an audio signal. The scene detector 510 may detect a scene by determining a scene switching point which is a point where a scene is switched. In the case of multimedia content, the scene detector 510 may detect a scene switching point in consideration of audio content and video content together. For example, the scene detector 510 may finally detect a scene switching point of the multimedia content by comparing a scene switching point detected for the audio content with a scene switching point detected for the video content.

There is high possibility that a new topic starts when a scene is switched to a new scene in that a scene may be segmented depending on contextual meaning as described above. Therefore, the content summarizer 500 may detect a scene included in content, and generate a content summary on a scene-unit content section.

The scene segmentation unit 520 may detect a boundary of a final scene by incorporating an isolated shot that does not belong to any scene as a result of scene detection into a front or rear scene. A shot means a section captured at a time without scene switching, and a scene may include a plurality of shots. For example, the scene segmentation unit 520 may detect similarity between an isolated shot and shots belonging to a front or rear scene, and incorporate the isolated shot into a scene detected by the scene detector 510 depending on the detected similarity.

The statistics obtaining unit 530 may obtain content analysis information corresponding to a scene section finally determined by the scene segmentation unit 520, and obtain statistics information for generating content summary information from the analysis information. The content analysis information means information output by the above-described determination module 130.

For example, the statistics obtaining unit 530 may obtain keywords included in at least one analysis information that may correspond to one scene section, and obtain the frequency of respective keywords. Also, the statistics obtaining unit 530 may determine whether keywords obtained for one or more scene sections correspond to a word registered in advance as a reserved word, and obtain the frequency of respective reserved words. In the case of a word registered in advance as a reserved word, information regarding a topic that may be determined depending on an appearance frequency may exist together.

The content information generator 540 may generate content summary information depending on statistics information by the statistics obtaining unit 530. For example, the content information generator 540 may finally determine a topic related to each keyword or reserved word depending on the frequency of a keyword or reserved word.

For example, it is assumed that words such as cloud, rain, snow, sun, temperature, etc. have been registered in advance as reserved words, and it is set in advance that a topic related to these may be determined as a weather forecast. In the case where many words such as cloud, rain, snow, sun, temperature, etc. appear in one or more scene sections, the content information generator 540 may determine a topic as a weather forecast.

Hereinafter, a method of analyzing content is described in more detail with reference to FIGS. 6 to 9.

Figure 6:
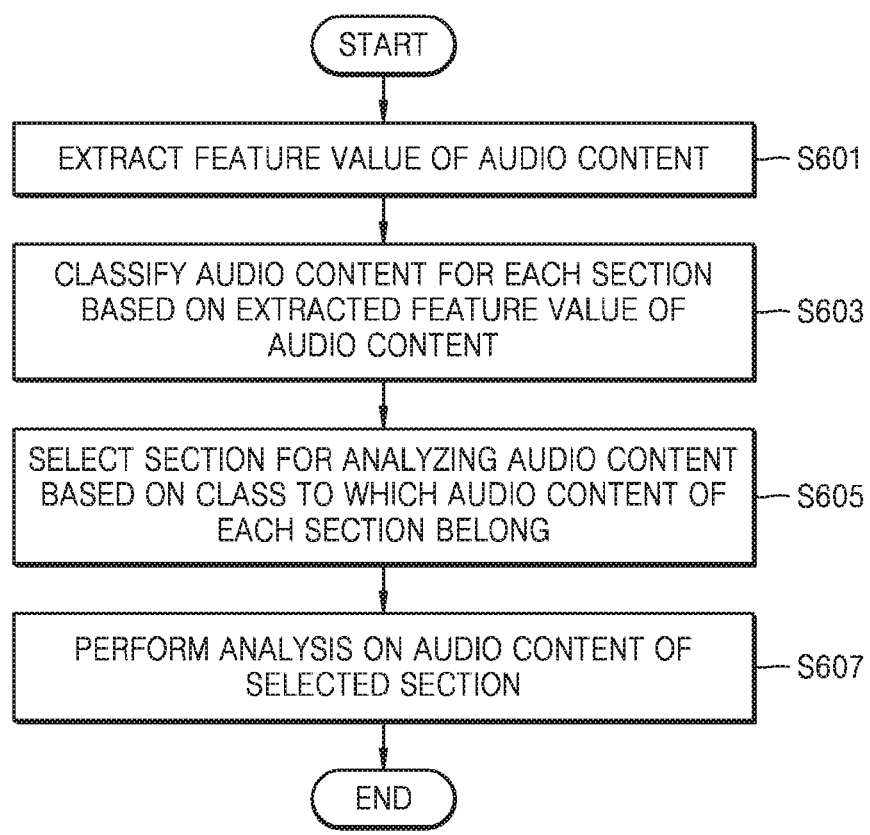
FIG. 6 is a flowchart illustrating a method of analyzing audio content according to an exemplary embodiment.

FIG. 6 is a flowchart illustrating a method of analyzing audio content according to an exemplary embodiment.

Referring to FIG. 6, in operation S601, the device 100 may extract a feature value from audio content to analyze. The device 100 may extract the feature value of the audio content by extracting an instantaneous feature value, and extracting a statistics feature value for a predetermined section from the instantaneous feature value.

In operation S603, the device 100 may classify audio content on a section basis based on the feature value of the audio content extracted in operation S601. The device 100 may determine a class to which audio content belongs by comparing a feature value of audio content stored in the database 260 with the feature value of the audio content extracted in operation S601. The class may be determined depending on a feature value of audio content, and the audio content may be classified as one of a voice, background music, and environment noise, for example.

The device 100 may obtain a feature value of audio content most similar to the extracted feature value of the audio content among values stored in the database 260. The device 100 may determine a class to which the feature value of the database 260 determined as most similar belongs as a class of audio content of a current section.

The device 100 may output class information of audio content of each section as a result of primary analysis. The class information may include position information of each section and information regarding a class to which each section belongs.

In operation S605, the device 100 may select a section for analyzing audio content based on a class to which audio content of each section belongs. To perform secondary analysis, the device 100 may select a section for analyzing audio content based on class information of each section as a result of the primary analysis. For example, in the case of intending to extract a keyword from content, the device 100 may select a content section belonging to a voice class including content where voice recognition is possible.

The device 100 according to an exemplary embodiment may improve analysis performance of audio content by selectively performing analysis depending on a feature of the audio content. In the case of a voice recognition technology for keyword extraction, since an algorithm is constructed on the assumption that an input signal is a voice signal, voice recognition may be optimally performed on audio content including a voice signal. Also, according to an exemplary embodiment, a case where voice recognition may be unnecessarily performed on audio content including only environment noise or background music, which does not include a voice may be minimized.

In operation S607, the device 100 may perform analysis on audio content of the section selected in operation S605. The device 100 may generate content analysis information by performing secondary analysis on audio content of the selected section. In the case of intending to extract a keyword from content, the device 100 may extract a keyword by performing voice recognition on an audio content section classified as a voice class. As the voice recognition is performed, the device 100 may detect a word or a sentence included in audio content, and extract a keyword by extracting words included in a reserved word list stored in advance from voice-recognition results.

Meanwhile, in the case of intending to recognize a speaker from content, the device 100 may perform speaker recognition on an audio content section classified as a voice class.

Hereinafter, a method of analyzing content for each scenario in the secondary analysis is described in more detail with reference to FIGS. 7 to 10. A content analysis method illustrated in FIGS. 7 to 10 relates to a secondary analysis method of the device 100, and assumes that the primary analysis has been already performed.

For the secondary analysis method according to an exemplary embodiment, a topic determination method, a sports highlight information generation method, and a view rating information generation method are described in more detail with reference to FIGS. 7 to 10.

Figure 7:
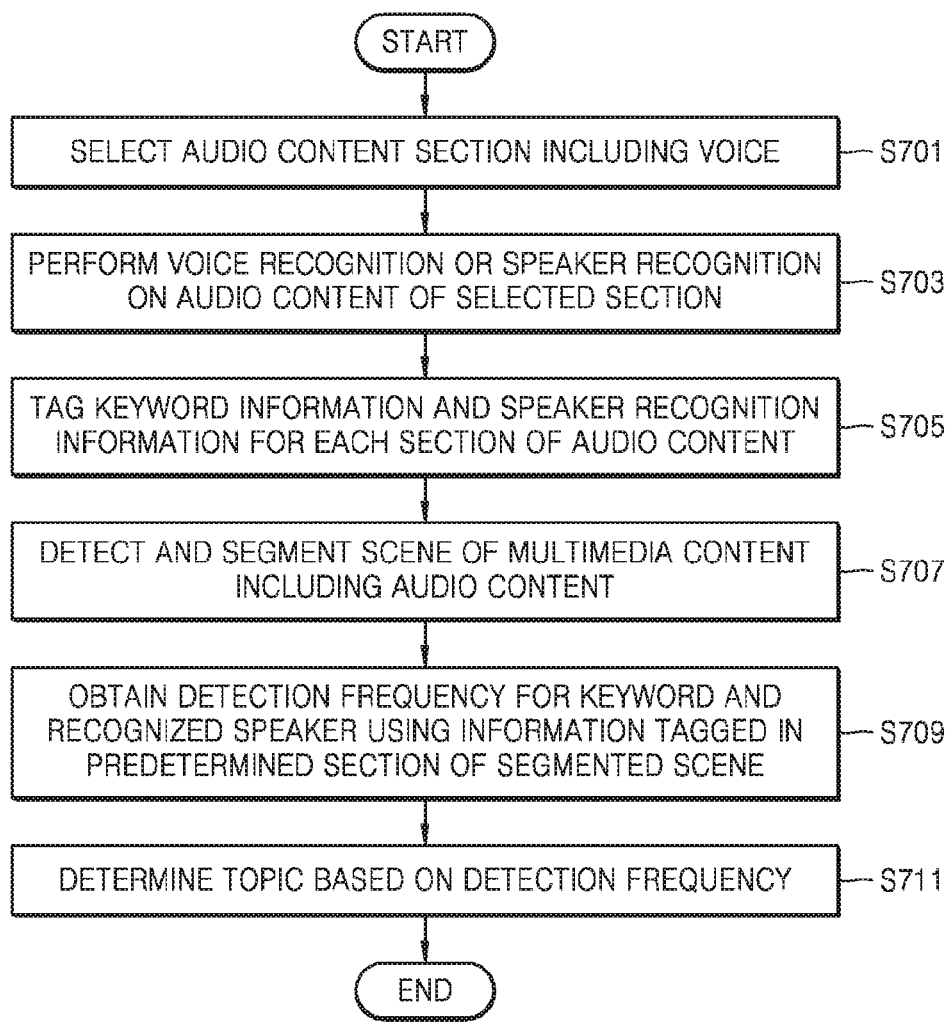
FIG. 7 is a flowchart illustrating a method of determining a topic of audio content according to an exemplary embodiment.

FIG. 7 is a flowchart illustrating a method of determining a topic of audio content according to an exemplary embodiment.

Referring to FIG. 7, in operation S701, the device 100 may select an audio content section including a voice. The device 100 may select an audio content section using information regarding a class determined for each section as a result of primary analysis. Since the device 100 may determine a topic of audio content via analysis of a voice section, the device 100 may select an audio content section classified as a voice class.

In operation S703, the device 100 may perform at least one of voice recognition and speaker recognition on the audio content of the section selected in operation S701. The voice recognition is for recognizing a keyword included in audio content, and the speaker recognition is for recognizing a speaker of a voice included in audio content. A topic may be generated based on a recognized keyword or speaker.

In operation S705, the device 100 may tag keyword information which is a result of voice recognition and speaker recognition information which is a result of speaker recognition for each section of audio content. The device 100 may tag keyword information and speaker recognition information for each section of audio content to the audio content. The device 100 may finally determine content analysis information including keyword information and speaker recognition information to tag by using content analysis information determined by the VME 120. The device 100 may perform tagging using start and end time information of a content section, keyword information, and speaker recognition information.

In operation S707, the device 100 may detect a scene of multimedia content including audio content in order to determine a topic. There is a high possibility that a new topic will start at a point where a new scene starts in that a scene may be classified in contextual meaning. Therefore, the device 100 may detect a scene, and determine a topic on a scene unit.

In operation S709, the device 100 may obtain a detection frequency for a keyword and a recognized speaker using information tagged for content corresponding to a predetermined section of the scene detected in operation S707. Also, in operation S711, the device 100 may finally determine a topic based on the frequency detected in operation S709. The device 100 may obtain a topic corresponding to reserved words registered in advance, detected in a predetermined section. Also, the device 100 may determine a topic including speaker information recognized in a predetermined section.

Figure 8:
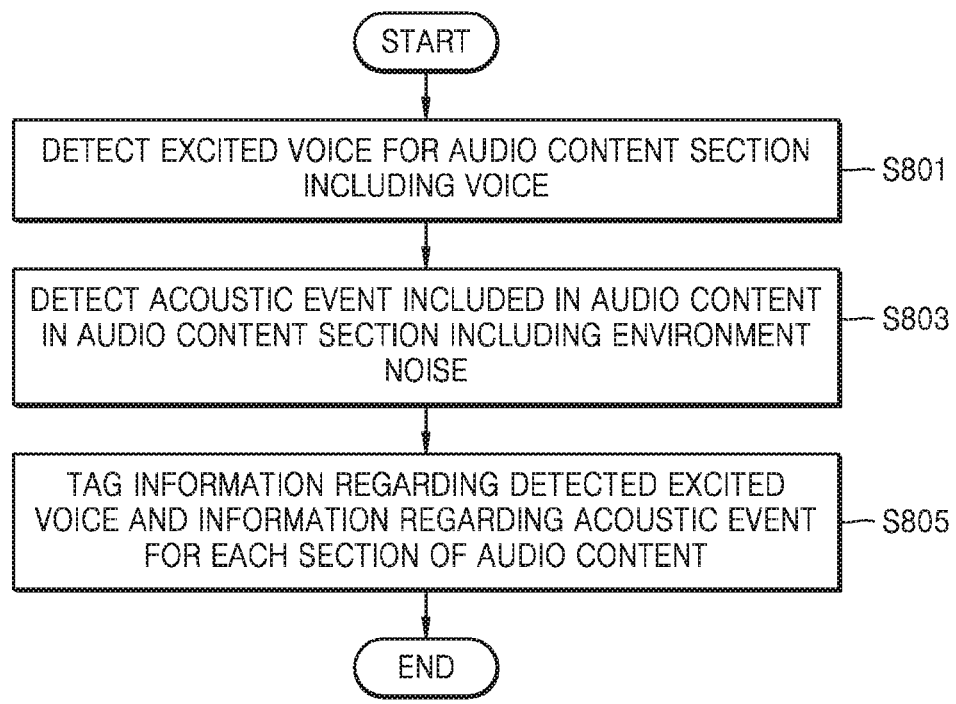
FIG. 8 is a flowchart illustrating a method of generating sports highlight information according to an exemplary embodiment.

FIG. 8 is a flowchart illustrating a method of generating sports highlight information according to an exemplary embodiment.

According to the method of generating sports highlight information illustrated in FIG. 8, the device 100 may consistently analyze a sports program while the sports program is broadcasted to generate content analysis information. Also, the device 100 may generate sports highlight information based on content analysis information generated depending on a user input. Even when a user may not view a sports program, the user may view primary scenes of the relevant content afterward by using sports highlight information generated by the device 100.

Referring to FIG. 8, in operation S801, the device 100 may select an audio content section including a voice, and detect excited speech of the selected audio content section. The device 100 may detect an audio content section including excited speech. The device 100 may select an audio content section using information regarding a class determined for each section as a result of primary analysis.

When a dramatic scene is created or a score is made during sports broadcasting, an announcer may speak with an excited voice. Therefore, the device 100 may detect an excited voice from audio content classified as a voice class in order to generate sports highlight information using a dramatic scene or a score scene. The excited voice may have a high volume voice or a high frequency. Therefore, the device 100 may detect an audio content section including an excited voice by using a fact that an excited voice has a different voice signal feature compared to a normal voice.

To detect an audio content section including an excited voice among audio content sections including a voice, the device 100 may use feature information regarding the excited voice. The feature information regarding the excited voice may be stored in advance in a different storage space.

In operation S803, the device 100 may select an audio content section including environment noise, and detect an acoustic event for the selected audio content section. The acoustic event may include a sound besides a voice or music, and include shouting of an audience, whistle, ball hit sound, etc. related to a dramatic scene or a score scene. The device 100 may detect an audio content section including an acoustic event. The device 100 may select an audio content section including environment noise using information regarding a class determined for each section as a result of primary analysis. Also, the device 100 may select an audio content section including an acoustic event among the selected audio content section. The device 100 may generate sports highlight information using an audio content section including an acoustic event.

To detect an audio content section including an acoustic event set in advance among an audio content section including environment noise, the device 100 may use feature information regarding the acoustic event. The feature information regarding the acoustic event may be stored in advance in a different storage space.

In operation S805, the device 100 may perform tagging on an audio content section including the excited voice and the acoustic event detected in operations S801 and S803. Information that may be tagged may include start and end time information of an audio content section, and information regarding an excited voice and an acoustic event.

The device 100 may generate sports highlight information using a content section including at least one of an excited voice and an acoustic event by using tagged information. For example, the device 100 may generate sports highlight information by generating a clip image including a content section including at least one of an excited voice and an acoustic event.

Figure 9:
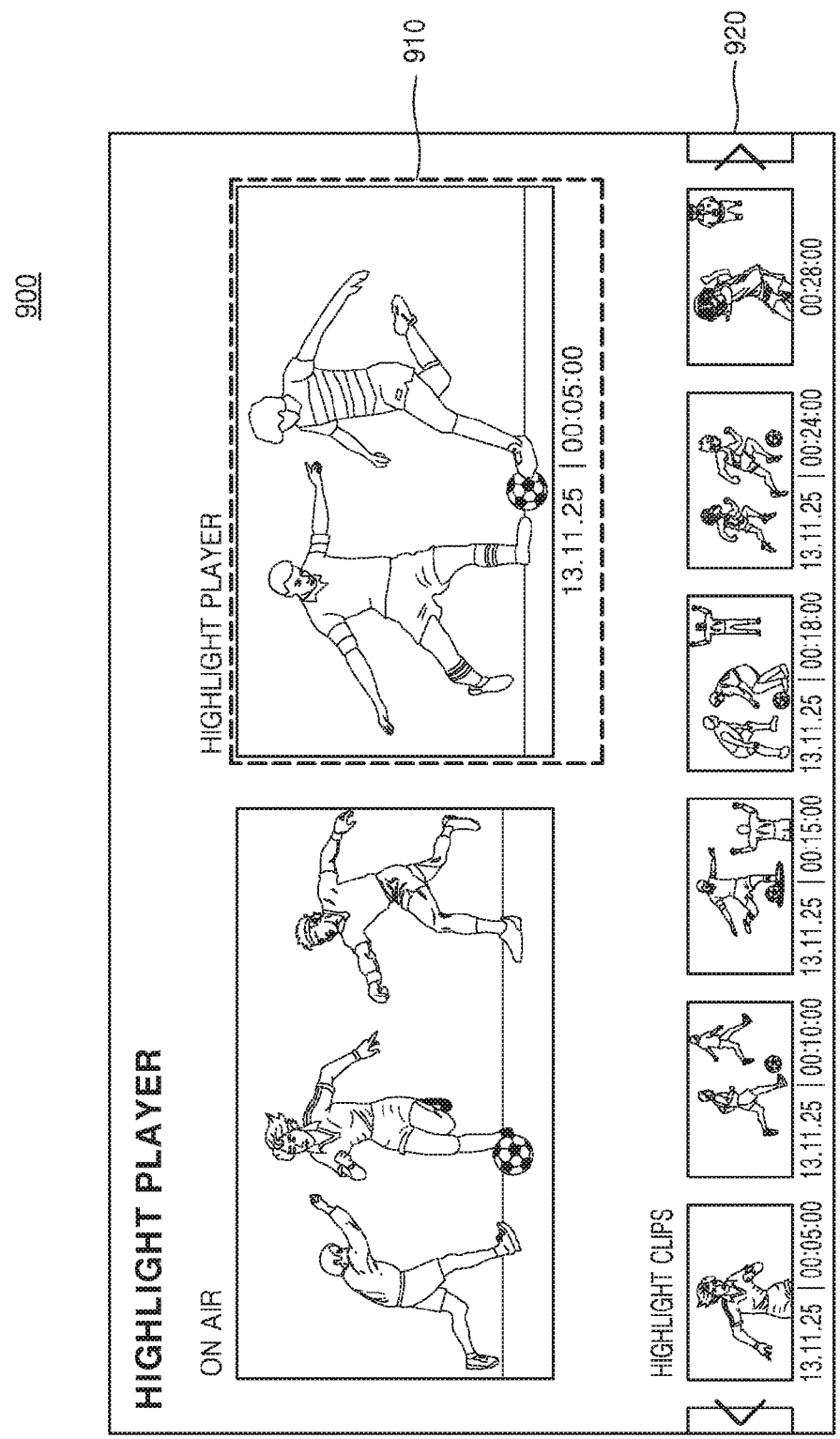
FIG. 9 is an exemplary view illustrating an example of sports highlight information according to an exemplary embodiment.

FIG. 9 is an exemplary view illustrating an example of sports highlight information according to an exemplary embodiment.

Referring to 900 of FIG. 9, sports highlight scenes 910 and 920 are illustrated. A sports highlight scene may be generated based on a content section including at least one of an excited voice and an acoustic event.

Figure 10:
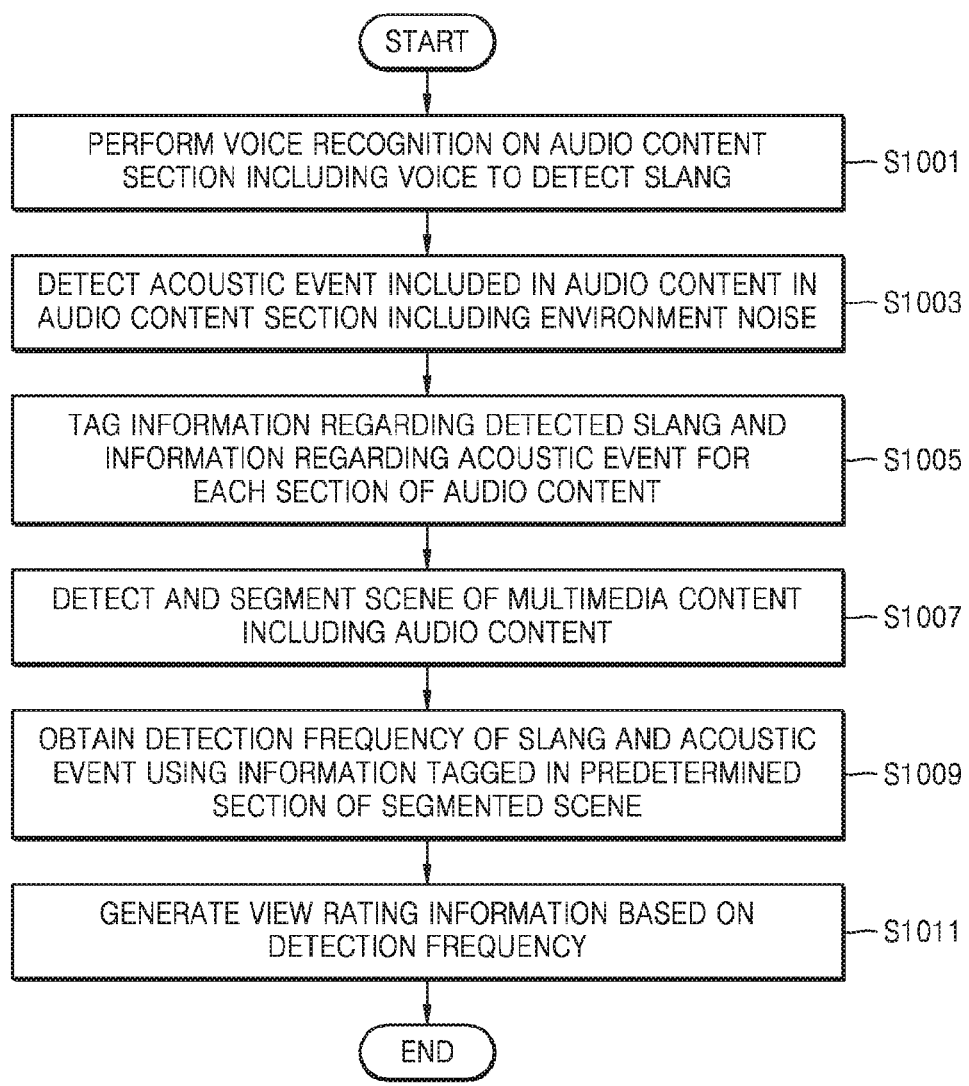
FIG. 10 is a flowchart illustrating a method of generating view rating information of content according to an exemplary embodiment.

FIG. 10 is a flowchart illustrating a method of generating view rating information of content according to an exemplary embodiment.

According to a method of generating view rating information of content illustrated in FIG. 10, the device 100 may generate view rating information including information about sexual content or degree of violence of content currently being viewed or viewable. A user may recognize a sexual content or degree of violence of relevant content by referring to view rating information of the content.

Referring to FIG. 10, in operation S1001, the device 100 may select an audio content section including a voice, and detect slang from the selected audio content section by performing voice recognition. The device 100 may detect slang included in the selected audio content section by using information regarding slang stored in advance.

In operation S1003, the device 100 may select an audio content section including environment noise, and detect an acoustic event from the selected audio content section. The acoustic event may include a sound besides a voice or music, and include gun shots, bombing, screams, etc. related to sexual content and violence.

To detect an audio content section including an acoustic event set in advance among audio content sections including environment noise, the device 100 may use feature information regarding the acoustic event. The feature information regarding the acoustic event may be stored in advance in a different storage space.

In operation S1005, the device 100 may perform tagging on an audio content section including the slang and the acoustic event detected in operations S1001 and S1003. Information that may be tagged may include start and end time information of an audio content section, and information regarding the slang and the acoustic event. The device 100 may generate view rating information by using a content section including at least one of the slang and the acoustic event using the tagged information.

In operation S1007, the device 100 may detect a scene of multimedia content including audio content in order to generate view rating information. There is a high possibility that new content will start at a point where a new scene starts in that a scene may be classified according to contextual meaning. Therefore, the device 100 may detect a scene, and generate view rating information on a scene unit.

In operation S1009, the device 100 may obtain a detection frequency of the slang and the acoustic event using the tagged information with respect to content corresponding to a predetermined section of the scene detected in operation S1007. The device 100 may obtain statistics for the detection frequency of the slang and the acoustic event.

In operation S1011, the device 100 may generate view rating information based on the frequency detected in operation S1009. The device 100 may determine a section where the slang and the acoustic event have been detected as a sexual content section or a violent section. The device 100 may allow weights influencing a degree of sexual content or violence to differ with respect to each slang and acoustic event. The device 100 may determine a degree of sexual content or violence of each section depending on a detection frequency and weight of each slang and acoustic event. Weight may be a value determined in advance.

The device 100 may generate view rating information by obtaining a ratio of a sexually explicit section or a violent section to entire content or a considerable section, and a degree of sexual content or violence of each section. The device 100 may generate view rating information representing a degree of sexual content or violence of a sexually explicit or violent section of content by defining an x-axis as a degree of sexual content and a y-axis as a degree of violence in a two-dimensional space.

Hereinafter, a device for analyzing content is described in more detail with reference to FIGS. 11 and 12.

Figure 11:
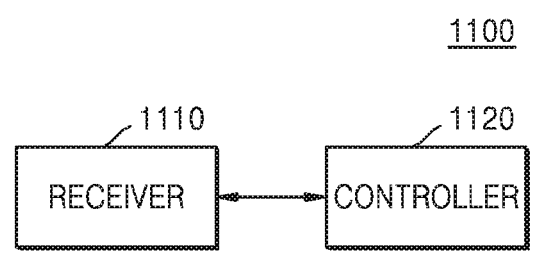
FIGS. 11 and 12 are block diagrams of an inner structure of a device for analyzing content according to an exemplary embodiment.

FIG. 11 is a block diagram of an inner structure of a device for analyzing content according to an exemplary embodiment.

Referring to FIG. 11, the device 1100 may include a receiver 1110 and a controller 1120. The device 1100 of FIG. 11 may correspond to the device 100 of FIG. 1.

The receiver 1110 may receive content to analyze. In addition, the receiver 1110 may obtain feature values of audio content for each class that may be used during content analysis, reserved word information for keyword extraction, etc.

The controller 1120 may perform analysis on the content received by the receiver 1110. The controller 1120 may extract a feature value of the received audio content, and classify the audio content on a section basis based on the extracted feature value. Also, the controller 1120 may select at least one section for analyzing the audio content based on a class to which audio content of each section belong, and perform analysis on audio content of the selected section.

In the case of extracting a keyword from audio content, the controller 1120 may select an audio content section classified as a voice class, and analyze content by performing voice recognition and speaker recognition on the selected audio content section.

Figure 12:
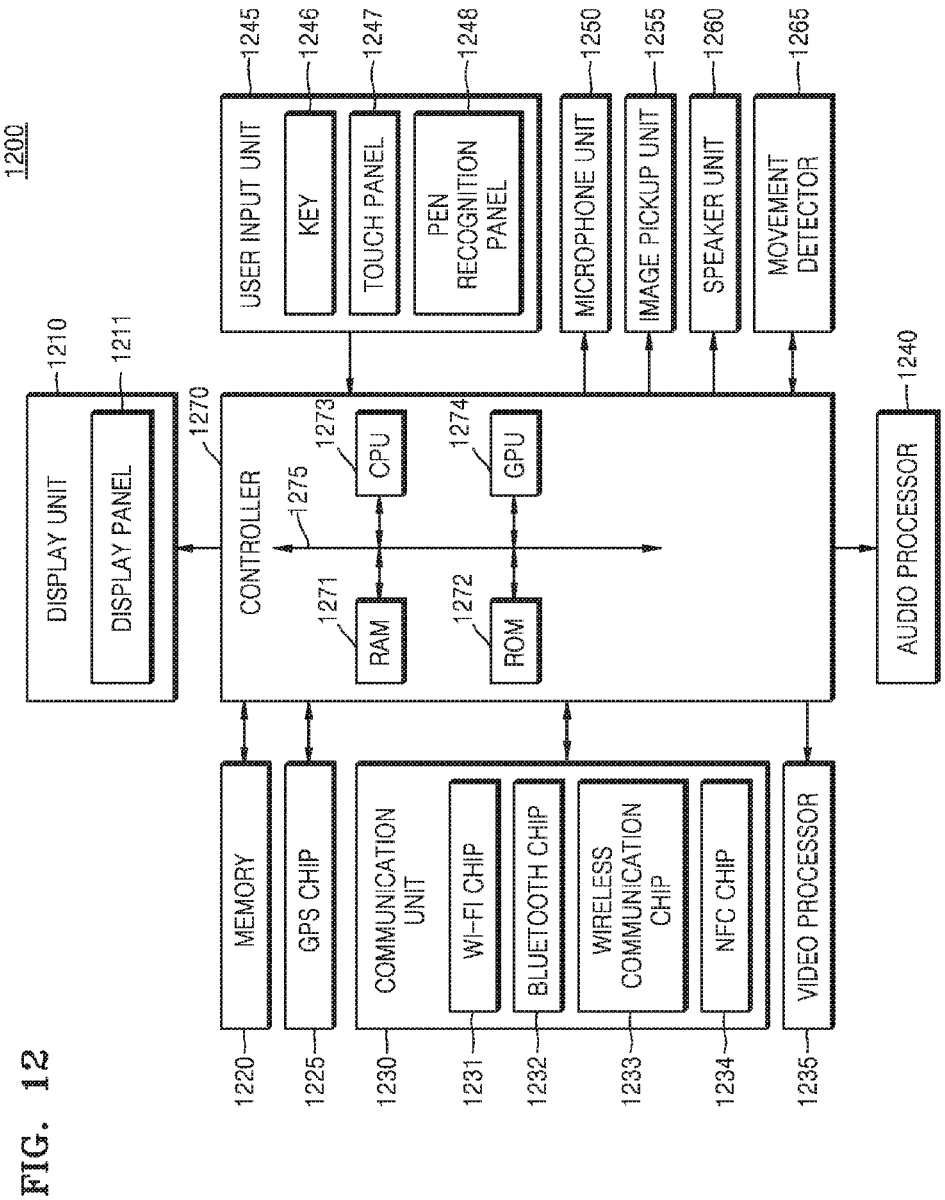

FIG. 12 is a block diagram of an inner structure of a device 1200 according to an exemplary embodiment.

As illustrated in FIG. 12, the device 1200 may include various types of devices that may be used by a user, for example, a mobile phone, a smartphone, a tablet PC, a PDA, an MP3 player, a kiosk, an electronic frame, a navigation device, a digital TV, a smart TV, a wearable device such as a wrist watch, or a head-mounted display (HMD).

The device 1200 may correspond to the devices 100 and 1100 of FIGS. 1 and 11, and analyze received audio content and output content summary information.

For example, as illustrated in FIG. 12, the device according to some exemplary embodiments may include a display unit 1210, a controller 1270, a memory 1220, a GPS chip 1225, a communication unit 1230, a video processor 1235, an audio processor 1240, a user input unit 1245, a microphone unit 1250, an image pickup unit 1255, a speaker unit 1260, a movement detector 1265, etc.

Hereinafter, the above elements are described in order.

The display unit 1210 may include a display panel 1211 and a controller (not shown) for controlling the display panel 1211. The display panel 1211 may be implemented in various forms of displays such as a liquid crystal display (LCD), an organic light emitting diode (OLED) display, an active-matrix organic light-emitting diode (AM-OLED), a plasma display panel (PDP), etc. The display panel 1211 may be implemented in such a manner that it is flexible, transparent, or wearable. The display unit 1210 may be coupled with a touch panel 1247 of the user input unit 1245 and provided as a touchscreen. For example, the touchscreen may include an integral type module where the display panel 1211 and the touch panel 1247 are coupled in a stacked structure.

The display unit 1210 according to an exemplary embodiment may display results of analyzing audio content and summary information of audio content under control of the controller 1270.

The memory 1220 may include at least one of an internal memory (not shown) and an external memory (not shown).

The internal memory may include, for example, at least one of a volatile memory (for example, dynamic RAM (DRAM), static RAM (SRAM), synchronous dynamic RAM (SDRAM), etc.), a non-volatile memory (for example, one time programmable ROM (OTPROM), programmable ROM (PROM), erasable and programmable ROM (EPROM), electrically erasable and programmable ROM (EEPROM), mask ROM, flash ROM, etc.), a hard disk drive (HDD), or a solid state drive (SSD). According to an exemplary embodiment, the controller 1270 may load an instruction or data received from at least one of the non-volatile memory and other elements onto the volatile memory and process the same. Also, the controller 1270 may conserve data received or generated from another element in the non-volatile memory.

The external memory may include, for example, at least one of compact flash (CF), secure digital (SD), micro-SD, mini-SD, extreme digital (xD), and a memory stick.

The memory 1220 may store various kinds of programs and data used for an operation of the device 1200. For example, the memory 1220 may store at least one of feature values of audio content belonging to each class, a reserved word, feature information of an excited voice, and feature information of an acoustic event temporarily or semi-permanently.

The controller 1270 may control the display unit 1210 so that a portion of information stored in the memory 1220 may be displayed on the display unit 1210. In other words, the controller 1270 may display multimedia content and content summary information stored in the memory 1220 on the display unit 1210. Alternatively, when a user gesture is performed on one region of the display unit 1210, the controller 1270 may perform a control operation corresponding to the user's gesture.

The controller 1270 may include at least one of a RAM 1271, a ROM 1272, a CPU 1273, a graphic processing unit (GPU) 1274, and a bus 1275. The RAM 1271, the ROM 1272, the CPU 1273, the GPU 1274, etc. may be connected with each other via a bus 1275.

The CPU 1273 accesses the memory 1220 to perform booting by using an operating system (O/S) stored in the memory 1220. Also, the CPU 1273 performs various operations using various kinds of programs, content, data, etc. stored in the memory 1220.

An instruction set, etc. for system booting are stored in the ROM 1272. For example, when a turn-on instruction is input and power is supplied to the device 1200, the CPU 1273 may copy the O/S stored in the memory 1220 to the RAM 1271 according to the instruction stored in the ROM 1272, and execute the O/S to boot the system. When booting is completed, the CPU 1273 copies various kinds of programs stored in the memory 1220 to the RAM 1271, and executes the program copied to the RAM 1271 to perform various kinds of operations. When booting of the user device 1200 is completed, the GPU 1274 displays a user interface (UI) screen on a region of the display unit 1210. Specifically, the GPU 1274 may generate a screen on which an electronic document including various objects such as content, an icon, a menu, etc. has been displayed. The GPU 1274 operates an attribute value such as a coordinate value, a form, a size, color, etc. in which respective objects are to be displayed depending on a layout of the screen. Also, the GPU 1274 may generate a screen of various layouts including an object based on the operated attribute value. The screen generated by the GPU 1274 may be provided to the display unit 1210 and displayed on respective regions of the display unit 1210.

A global positioning system (GPS) chip 1225 may receive a GPS signal from a GPS satellite to calculate a current position of the device 1200. The controller 1270 may calculate a user position using the GPS chip 1225 when using a navigation program or in the case where a current position of a user is required.

The communication unit 1230 may perform communication with various types of external devices depending on various types of communication schemes. The communication unit 1230 may include at least one of a wireless fidelity (Wi-Fi) chip 1231, a Bluetooth chip 1232, a wireless communication chip 1233, and a near field communication (NFC) chip 1234. The controller 1270 may perform communication with various kinds of external devices using the communication unit 1230. For example, the controller 1270 may receive a control signal from an external device via the communication unit 1230, and transmit results corresponding to the control signal to the external device.

The Wi-Fi chip 1231 and the Bluetooth chip 1232 may perform communication in a Wi-Fi scheme and a Bluetooth scheme, respectively. In the case of using the Wi-Fi chip 1231 or the Bluetooth chip 1232, the device 1200 may transmit/receive various kinds of connection information such as an SSID, a session key, etc. first to connect communication using this, and then transmit/receive various kinds of information. The wireless communication chip 1233 means a chip for performing communication according to various communication standards such as IEEE, Zigbee, 3rd generation (3G), 3rd generation partnership project (3GPP), long term evolution (LTE), etc. The NFC chip 1234 means a chip operating in an NFC scheme that uses a 13.56 MHz band among various radio frequency-identification (RF-ID) frequency bands such as 135 kHz, 13.56 MHz, 433 MHz, 860~960 MHz, 2.45 GHz, etc.

The video processor 1235 may process video content included in multimedia content received via the communication unit 1230 or multimedia content stored in the memory 1220. The video processor 1235 may perform various image processes such as decoding, scaling, noise filtering, frame rate conversion, resolution conversion, etc. for video content.

The audio processor 1240 may process audio content included in multimedia content received via the communication unit 1230 or multimedia content stored in the memory 1220. The audio processor 1240 may perform various processes such as decoding, amplification, noise filtering, etc. in order to reproduce audio content or perform analysis.

When a reproduction program for multimedia content is executed, the controller 1270 may drive the video processor 1235 and the audio processor 1240 to reproduce multimedia content. The speaker unit 1260 may output audio content generated by the audio processor 1240.

The user input unit 1245 may receive various instructions from a user. The user input unit 1245 may include at least one of a key 1246, a touch panel 1247, and a pen recognition panel 1248. The device 1200 may display various content or a user interface depending on a user input received from at least one of the key 1246, the touch panel 1247, and the pen recognition panel 1248.

The key 1246 may include various types of keys such as a mechanical button, a wheel, etc. formed on various regions such as the front portion, the lateral portion, the rear portion, etc. of a main body appearance of the device 1200.

The touch panel 1247 may detect a user's touch input, and output a touch event value corresponding to a detected touch signal. In the case where the touch panel 1247 couples with the display panel 1211 to configure a touchscreen (not shown), the touchscreen may be implemented using various types of touch sensors such as capacitive, resistive, or piezoelectric touch sensors. A capacitive touchscreen detects fine electricity caused to a user's body when a portion of the user's body is touched on the touchscreen surface by using a dielectric coated on the touchscreen surface to calculate a touch coordinate. A resistive touchscreen includes two electrode plates built in the touchscreen. When a user touches the screen, the resistive touchscreen detects that up and down plates of a touched point contact and a current flows through it to calculate a touch coordinate. A touch event occurring on the touchscreen may be mainly generated by a human finger, but generated by even an object formed of a conductive material that may exert a capacitance change.

The pen recognition panel 1248 may detect a proximity input or a touch input of a pen corresponding to an operation of a user's pen for touch (for example, a stylus pen, a digitizer pen) and output the detected pen proximity event or pen touch event. The pen recognition panel 1248 may be implemented, for example, using an electromagnetic resonance (EMR) method, and may detect a touch or proximity input depending on an intensity change of an electromagnetic field due to a proximity or touch of the pen. In detail, the pen recognition panel 1248 may include an electromagnetic coil sensor (not shown) having a grid structure, and an electronic signal processor (not shown) sequentially providing an alternating current (AC) signal having a predetermined frequency to respective loop coils of the electromagnetic coil sensor. When a pen having a built-in resonance circuit exists in the neighborhood of the loop coil of the pen recognition panel 1248, a magnetic field transmitted from a relevant loop coil generates a current that is based on mutual electromagnetic induction to the resonance circuit inside the pen. Based on this current, an induction magnetic field is generated from a coil forming the resonance circuit inside the pen, and the pen recognition panel 1248 detects this induction magnetic field from the loop coil which is in a signal receiving state, so that an approach position or a touch position of the pen may be detected. The pen recognition panel 1248 may be prepared with a predetermined area at the lower portion of the display panel 1211, for example, an area that may cover a display region of the display panel 1211.

The microphone unit 1250 may receive a user voice or other sounds to convert the same to audio data. The controller 1270 may use a user voice input via the microphone unit 1250 in a communication operation, or convert the user voice into audio data to store the same in the memory 1220.

The image pickup unit 1255 may capture a still image or a moving image under a user's control. The image pickup unit 1255 may be implemented using a plurality of cameras such as a front camera and a rear camera.

In the case where the image pickup unit 1255 and the microphone unit 1250 are provided, the controller 1270 may perform a control operation depending on a user voice input via the microphone unit 1250 or a user motion recognized by the image pickup unit 1255. For example, the device 1200 may operate in a motion control mode or a voice control mode. In case of operating in the motion control mode, the controller 1270 may activate the image pickup unit 1255 to photograph a user and track the user's motion change to perform a control operation corresponding thereto. For example, the controller 1270 may generate and output summary information of content currently being viewed depending on the user's motion input detected by the image pickup unit 1255. In the case of operating in the voice control mode, the controller 1270 may operate in a voice recognition mode that analyzes a user voice input via the microphone unit 1250 and performs a control operation depending on the analyzed user voice.

The movement detector 1265 may detect a main body movement of the user device 1200. The user device 1200 may be rotated or inclined in various directions. At this point, the movement detector 1265 may detect a movement characteristic such as a rotation direction, an angle, a slope, etc. by using at least one of various sensors such as a geomagnetic sensor, a gyro sensor, an acceleration sensor, etc. For example, the movement detector 1265 may receive a user input by detecting a main body movement of the user device 1200, and perform a control operation depending on the received input.

Besides, although not shown in FIG. 12, an exemplary embodiment may further include a universal serial bus (USB) port to which a USB connector may be connected, various external input ports for connecting with various external terminals such as a headset, a mouse, a local area network (LAN), etc. a digital multimedia broadcasting (DMB) chip for receiving and processing a DMB signal, various sensors, etc. inside the user device 1200.

Names of the above-described elements of the device 1200 may change. Also, the device 1200 according to the present disclosure may include at least one of the above-described elements, some of the elements may be omitted or other additional elements may be further included.

According to an exemplary embodiment, analysis is selectively performed depending on a feature value of audio content for each section during content analysis, so that content analysis performance may improve.

The methods according to some exemplary embodiments may be embodied in the form of program commands executable through various computer means, which may be recorded on a computer-readable recording medium. The computer-readable recording medium may include program commands, data files, and data structures either alone or in combination. The program commands recorded on the computer-readable recording medium may be those that are especially designed and configured for the inventive concept, or may be those that are known and available to computer programmers skilled in the art. Examples of the computer-readable recording medium include magnetic recording media such as hard disks, floppy disks, and magnetic tapes, optical recording media such as CD-ROMs and DVDs, magneto-optical recording media such as floptical disks, and hardware devices such as ROMs, RAMs, and flash memories that are especially configured to store and execute program commands. Examples of the program commands include machine language codes that may be generated by a compiler, and high-level language codes that may be executed by a computer by using an interpreter.

While the inventive concept has been particularly shown and described with reference to exemplary embodiments thereof, it will be understood by those of ordinary skill in the art that various deletions, replacements, and modifications in form and details of the above-described apparatus and method may be made therein without departing from the spirit and scope of the following claims. All modifications within equivalents of claims are included in the scope of the inventive concept.

The invention claimed is:

1. A method of analyzing an audio signal in a device, the method comprising:
extracting a feature value of the audio signal;
determining a first classification of the audio signal from among at least one of a voice, background music and environment noise based on the extracted feature value;
determining a second classification of the audio signal based on the first classification of the audio signal; and
displaying information related to the audio signal, based on the first and second classification of the audio signal,
wherein the determining the second classification comprises:
performing a voice recognition for the audio signal if the first classification of the audio signal is the voice;

extracting a keyword from the audio signal, based on a result of the voice recognition; and determining a topic of the audio signal, based on a frequency of at least one of the extracted keyword and reserved word related to the extracted keyword.

2. The method of claim 1, wherein the determining the first classification comprises determining the first classification of the audio signal by comparing a feature value of the audio signal with a feature value of a database by using the database comprising information regarding at least one feature value of the audio signal.

3. The method of claim 1, wherein the extracting of the feature value comprises:

decomposing the audio signal into at least one elementary function;

selecting at least one of the at least one elementary function as a dominant elementary function with respect to the decomposed audio signal; and extracting a basis function as the feature value of the audio signal by using the at least one selected dominant elementary function.

4. The method of claim 1, wherein the extracting of the feature value comprises:

extracting at least one instantaneous feature value from the audio signal; and extracting a statistical feature value from the at least one extracted instantaneous feature value.

5. The method of claim 1, wherein the determining the second classification comprises:

if the first classification of the audio signal is the environment noise detecting an acoustic event included in the audio signal.

6. The method of claim 1, wherein the determining the second classification comprises:

performing analysis on video signal corresponding to the audio signal; and determining the second classification of the audio signal by using analysis results for the video signal.

7. A device comprising:

a receiver for receiving audio signal;

a controller for extracting a feature value of the audio signal, determining a first classification of the audio signal from among at least one of a voice, background music and environment noise based on the extracted feature value, and determining a second classification of the audio signal based on the first classification of the audio signal;

a display for displaying information related to the audio signal, based on the first and second classification of the audio signal, wherein the controller:

performs a voice recognition for the audio signal if the first classification of the audio signal is the voice;

extracts a keyword from the audio signal, based on a result of the voice recognition; and determines a topic of the audio signal, based on a frequency of at least one of the extracted keyword and reserved word related to the extracted keyword.

8. The device of claim 7, wherein the controller determines the first classification of the audio signal by comparing a feature value of the audio signal with a feature value of a database by using the database comprising information regarding at least one feature value of the audio signal.

9. The device of claim 7, wherein the controller decomposes the audio signal into at least one elementary function, selects at least one of the at least one elementary function as a dominant elementary function with respect to the decomposed audio signal, and extracts a basis function as the feature value of the audio signal by using the at least one selected dominant elementary function.

10. The device of claim 7, wherein the controller extracts at least one instantaneous feature value from the audio signal, and extracts a statistical feature value from the at least one extracted instantaneous feature value.

11. The device of claim 7, wherein if the first classification of the audio signal is the environment noise, the controller detects an acoustic event included in the audio signal.

12. The method of claim 2, wherein the feature value of the database is updated based on the extracted feature value and the determined first classification.

13. The device of claim 8, wherein the feature value of the database is updated based on the extracted feature value and the determined first classification.

14. The method of claim 1, wherein the reserved word is a word registered in advance.

15. The device of claim 7, wherein the reserved word is a word registered in advance.

* * * * *